United States Patent
Menke (10) Patent No.: US 10,183,808 B2
(45) Date of Patent: Jan. 22, 2019

(54) MODULE FOR A CONVEYOR CHAIN AND MODULAR CONVEYOR CHAIN

(71) Applicant: Rexnord FlatTop Europe B.V., 's-Gravenzande (NL)

(72) Inventor: Cornelis Hendrik Mijndert Menke, 's-Gravenzande (NL)

(73) Assignee: REXNORD FLATTOP EUROPE B.V., S-Gravenzande (NL)

( * ) Notice: Subject to any disclaimer, the term of this patent is extended or adjusted under 35 U.S.C. 154(b) by 142 days.

(21) Appl. No.: 15/102,800

(22) PCT Filed: Dec. 9, 2014

(86) PCT No.: PCT/NL2014/050842
§ 371 (c)(1),
(2) Date: Jun. 8, 2016

(87) PCT Pub. No.: WO2015/088336
PCT Pub. Date: Jun. 18, 2015

(65) Prior Publication Data
US 2018/0134495 A1 May 17, 2018

(30) Foreign Application Priority Data
Dec. 10, 2013 (NL) ..................................... 2011934

(51) Int. Cl.
*B65G 17/06* (2006.01)
*B65G 17/08* (2006.01)

(52) U.S. Cl.
CPC .............. *B65G 17/08* (2013.01); *B65G 17/06* (2013.01)

(58) Field of Classification Search
CPC ....... B65G 17/06; B65G 17/08; B65G 17/083
(Continued)

(56) References Cited

U.S. PATENT DOCUMENTS

| | | | | |
|---|---|---|---|---|
| 2,126,274 A | * | 8/1938 | Noffsinger | A01D 17/10 198/853 |
| 2,852,129 A | * | 9/1958 | Conner | B65G 17/06 198/853 |

(Continued)

FOREIGN PATENT DOCUMENTS

| | | |
|---|---|---|
| CA | 2214475 A1 | 3/1998 |
| CA | 2477145 C | 4/2011 |

(Continued)

OTHER PUBLICATIONS

International Search Report dated Feb. 26, 2015 for International Application No. PCT/NL2014/050842.

*Primary Examiner* — James R Bidwell
(74) *Attorney, Agent, or Firm* — Quarles & Brady LLP (57) ABSTRACT

A module (1) for a modular conveyor chain (8), comprising a link portion (2) made of sheet metal that includes a substantially elongate conveying body (3), having a centrally located coupling piece (4) on one longitudinal side thereof and a pair of coupling pieces (4) on an opposite longitudinal side thereof, that are inter-spaced to receive the centrally located coupling piece of a link portion of a consecutive module therebetween, wherein the coupling pieces extend from the body part to loop around a receiving space (5) for a hinge pin (7), wherein the coupling pieces form less then a three quarter loop relative to a plane defined by the conveying body.

23 Claims, 7 Drawing Sheets

(58) Field of Classification Search
USPC .................................................. 198/850, 853
See application file for complete search history.

(56) References Cited

U.S. PATENT DOCUMENTS

| | | | | | |
|---|---|---|---|---|---|
| 3,776,349 | A | * | 12/1973 | Kampfer | B65G 17/086 198/852 |
| 3,807,548 | A | * | 4/1974 | Bergeron | B65G 17/086 198/850 |
| 4,473,365 | A | * | 9/1984 | Lapeyre | B65G 17/08 198/850 |
| 4,676,368 | A | * | 6/1987 | Damkjar | B65G 17/08 198/852 |
| 7,314,132 | B2 | * | 1/2008 | Layne | B65G 17/08 198/850 |

FOREIGN PATENT DOCUMENTS

| | | |
|---|---|---|
| CN | 1997574 A | 7/2007 |
| CN | 201201802 Y | 3/2009 |
| DE | 10331977 B4 | 2/2011 |
| GB | 325 929 | 3/1930 |
| WO | 8303402 A1 | 10/1983 |
| WO | 2004099041 A2 | 11/2004 |
| WO | 2006/022659 | 3/2006 |

* cited by examiner

PRIOR ART

FIG. 1

PRIOR ART

FIG. 2

PRIOR ART

MODULE FOR A CONVEYOR CHAIN AND MODULAR CONVEYOR CHAIN

CROSS-REFERENCE TO RELATED APPLICATIONS

This application represents the national stage entry of PCT International Application No. PCT/NL2014/050842 filed on Dec. 9, 2014 and is based upon and claims the benefit of priority from Dutch Patent Application No. 2011934, filed on Dec. 10, 2013, the entire contents of all of which are incorporated herein by reference.

The invention relates to a module for a conveyor chain, comprising a link portion made of sheet metal, and a conveyor chain comprising such modules.

Metal modular conveyor chains are generally known, and are e.g. used for conveying glass bottles.

Metal conveyor chain modules are so conventional that they have been standardized in DIN 8153/ISO 4348. The DIN 8153/ISO 4348 standardization determines the sizes and dimensions of so called flat-top chain modules, e.g. the pitch between chain modules, the hinge pin diameter and e.g. how the coupling pieces of the portions of the modules need to be curled. The standardization applies to chains with both single hinged and double hinged assembly.

Figure 1:
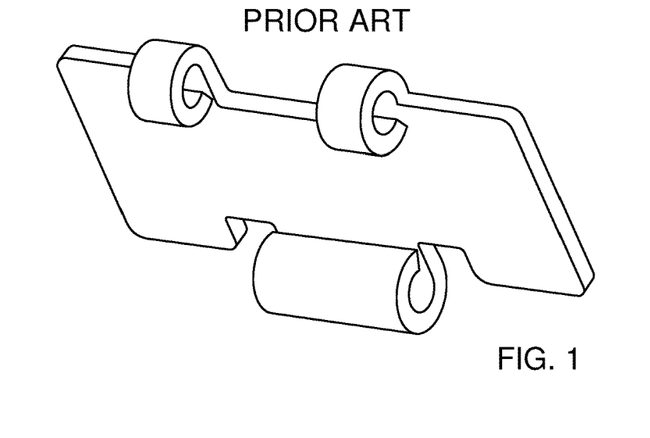
FIG. 1 shows a perspective bottom view of a prior art standard chain module.
Figure 2:
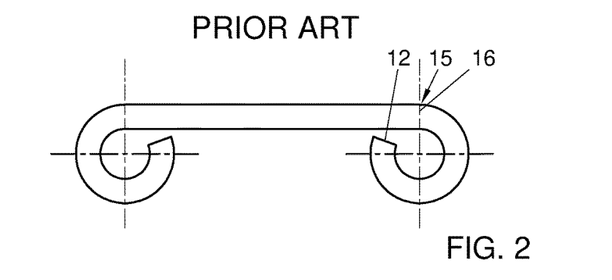
FIG. 2 shows a side view of a prior art standard chain module of FIG. 1.

The hinge assembly consists of hinge eyes that loop around a hinge receiving space as depicted in prior art FIGS. 1 and 2 in order to retain the hinge pin tightly, such that the hinge pin will not slip out.

The customary chains are manufactured by punching chain link blanks from sheet metal resulting in a base form for a link portion. The blanks consist of an elongate conveying body and tongues extending from longitudinal sides of the conveying body. One tongue is centrally located on one longitudinal side of the elongate conveying body and two spaced apart tongues are placed on the opposite longitudinal side. The two spaced apart tongues on one longitudinal side are arranged such that the when the tongues are formed to be hinge eyes, the centrally placed hinge eye is received between the two spaced apart hinge eyes on a consecutive module. Such a known blank for forming a customary chain is depicted in prior art FIG. 3.

Figure 3:
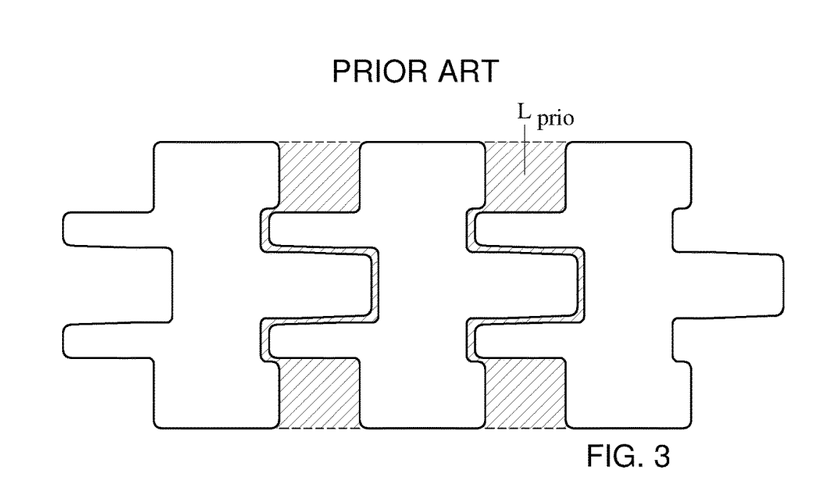
FIG. 3 shows a nesting pattern of prior art standard blanks

To minimize sheet metal losses during punching of chain link blanks, the consecutive chain link blanks are punched in a nesting pattern as depicted in prior art FIG. 3, where the centrally placed tongue will fit in between the two spaced apart tongues of a consecutive blank to be punched. As approximately 80% of the production costs of a sheet metal chain link can be related to material cost, saving material will have a big impact on reducing the total production cost of a sheet metal chain link. Saving material has been an area of focus for the industry for a long time. Nevertheless, prior art FIG. 3 shows that there are still material losses $L_{prio}$ which constitute to about 25% of sheet material losses. For a larger chain manufacturing plant, the yearly amount of sheet material loss may be enough to construct a copy of the Eiffel tower in stainless steel.

An object of the invention therefore is to provide a modular conveyor chain that mitigates the above mentioned losses still further.

Thereto, the invention provides a module for a modular conveyor chain, comprising a link portion made of sheet metal that includes a substantially elongate conveying body, having a centrally located coupling piece on one longitudinal side thereof and a pair of coupling pieces on an opposite longitudinal side thereof, that are interspaced to receive the centrally located coupling piece of a link portion of a consecutive module therebetween, wherein the coupling pieces extend from the conveying body to loop around a receiving space for a hinge pin, wherein at least one of the coupling pieces forms less then a three quarter loop relative to a plane defined by the conveying body.

By forming the at least one coupling piece such that it loops less then a three quarter loop relative to a plane defined by the conveying body, it is ensured that tensile forces can still be transferred to a consecutive module via a hinge pin, yet at a reduced length of the tongue needed for the coupling piece. Reducing the length of the coupling piece has the advantage that sheet metal blanks can be punched out of a piece of sheet metal, wherein the pattern of punching blanks can be nested considerably closer together, hence reducing the amount of sheet metal material losses.

In addition, the shorter loop leaves a gap between the loop and the bottom of the conveying body through which a hinge pin that is carried on a consecutive module may pass when assembling the modules into a chain. The module may comprise a single hinge loop that is looped to form less than three quarters of a loop. For example, this may be the centrally located hinge loop. Additionally or as an alternative, the spaced apart hinge loops may be formed to loop less than three quarters of a loop. The hinge loops may preferably have a partial tubular shape of which a central axis extends parallel to the longitudinal side of the conveying body. Further, they may extend forwardly and outwardly from the conveying body. In addition, the length of the hinge loop having the partial tubular shape, extending parallel to the longitudinal side may be greater than the thickness of e.g. the conveying body. Some coupling elements may not be formed in a loop. For example, the tongue of the centrally located coupling element may be looped into less than three quarters of a loop, while the spaced apart tongues of the coupling elements may be bent to extend straight, e.g. substantially perpendicularly downward from the conveying body. The spaced apart coupling element may then carry a hinge pin that is fixedly connected thereto, e.g. by means of welding, and the hinge pin may induce a flattened portion that may pass the gap at the shortened centrally located hinge loop.

When the coupling pieces form less then half a loop relative to a plane defined by the conveying body, even less material losses can be achieved and tensile loads can still be transferred. However, if the coupling pieces form more then a quarter loop relative to a plane defined by the conveying body, it is ensured that tensile loads can still be transferred from one module to another via the coupling pieces and the hinge pin, also when consecutive modules round a divert wheel.

By providing the module with an auxiliary element for retaining a hinge pin in the hinge receiving space, it can be prevented that a hinge pin can slip out of the receiving space, when e.g. the chain becomes slack and there is no tensile force on the hinge pin. By providing the auxiliary element on the bottom face of the conveying body, it may be achieved that the auxiliary element does not interfere with objects that are placed on the upper side of the conveying body. However, an auxiliary element may also be provided on the upper side if so desired.

The auxiliary element may be integrally formed with part of the module. For example, a cut-out in the conveying body can be bent downwards towards the lower side of the conveying body to form a lip that is able to retain the hinge pin in the receiving space. The auxiliary element may also be made as a separate element.

The auxiliary element may comprise plastic. The auxiliary element may then e.g. be manufactured by means of injection molding. The auxiliary element may be connected to the module when formed, e.g. by means of injection molding. The plastic auxiliary element can be made such that it can clamp a hinge pin in the receiving space of a module and/or the auxiliary element.

Instead of connecting with injection molding, the auxiliary element may be welded thereto or may be connected to the module by means of adhesive. This can be any type of suitable adhesive, e.g. contact adhesive.

The auxiliary element may comprise metal, and may e.g. be stamped, punched, sintered or cast. A metal auxiliary element can be made of thinner, less expensive sheet metal that is strong enough to clamp a hinge pin in the receiving space. The auxiliary element may also be manufactured from another type of metal than the link portion. The metal auxiliary element may be connected to the module by means of welding and/or spot welding, but it is also possible to apply the auxiliary element by means of adhesive.

The invention also provides a modular conveyor chain, comprising a series of modules, wherein the centrally located coupling piece of a module is received by the interspaced coupling pieces of a consecutive module, wherein cooperating coupling pieces are connected by means of a hinge pin extending through the receiving space.

The hinge pin that extends through the receiving space has a central axis, which central axis substantially defines the axis of rotation between two consecutive modules, wherein for every module quadrants can be defined in a plane perpendicular to the axis of rotation, wherein the origins of the quadrants may coincide with the central axis and wherein a first positive axis in the plane is substantially parallel to the plane defined by the conveying body. The first positive axis is defined as the positive X-axis of an X-Y axis Cartesian right handed reference system, respectively, the second positive axis is the positive Y axis.

The modular conveyor chain can be kept together without the hinge pin slipping out of the receiving space as long as the chain is under tension. This is because the coupling pieces are looped around the receiving space just enough to be able to transfer the tension loads in a planar movement of the chain, as well as when the chain goes around a drive wheel or divert wheel. However, the modular conveyor chain may comprise auxiliary elements that are provided to at least one module for retaining a hinge pin in the hinge receiving space. This is to ensure that the hinge pin can not slip out due to transversal forces acting on the hinge pin or when the chain is slack, or transverse frictional forces.

The auxiliary element can be provided on all the modules of the conveyor chain, but it is also possible that e.g. every second module is provided with an auxiliary element, e.g. an auxiliary element that acts on two consecutive hinge pins. The cost of applying an auxiliary element to all modules can therefore be saved, while every hinge pin is still clamped by an auxiliary element. Nevertheless, other patterns of providing auxiliary elements to modules of a modular conveyor chain are possible as well, e.g. every third module or a random distribution.

A hinge pin located between a module and a consecutive module may be fixedly connected to at least one coupling piece of the module or the consecutive module, e.g. by means of welding, spot welding or adhesive. In this way it is ensured that the coupling pieces of either one or the other of two cooperating modules respectively can move around the hinge pin, whilst the coupling piece and/or pieces of the other module are not moving, or vice versa.

The hinge pin can have a substantially round cross-section or a D-shaped cross-section or may be of mixed cross sectional shape. The pin may e.g. have a circular cross section in the middle, and a D-shaped cross section at the ends. The cross section may vary along the length of the pin, and e.g. may have a different D-shape at a central portion compared to the end portions. The shape of the coupling pieces may be adapted to the cross-sectional shape of the corresponding hinge pin.

The coupling pieces of two cooperating modules on a hinge pin may be of a different length and/or may loop more or less far around the hinge receiving space. For example, coupling pieces fixedly connected to a hinge pin may be shorter then coupling pieces that are not fixedly connected, or vice versa.

The invention will further be elucidated on the basis of exemplary embodiments which are represented in the drawings. The exemplary embodiments are given by way of non-limitative illustration of the invention.

In the drawings.

It is noted that the figures are only schematic representations that are given by way of non-limited example. In the figures, the same or corresponding parts are designated with the same reference numerals.

Figure 4:
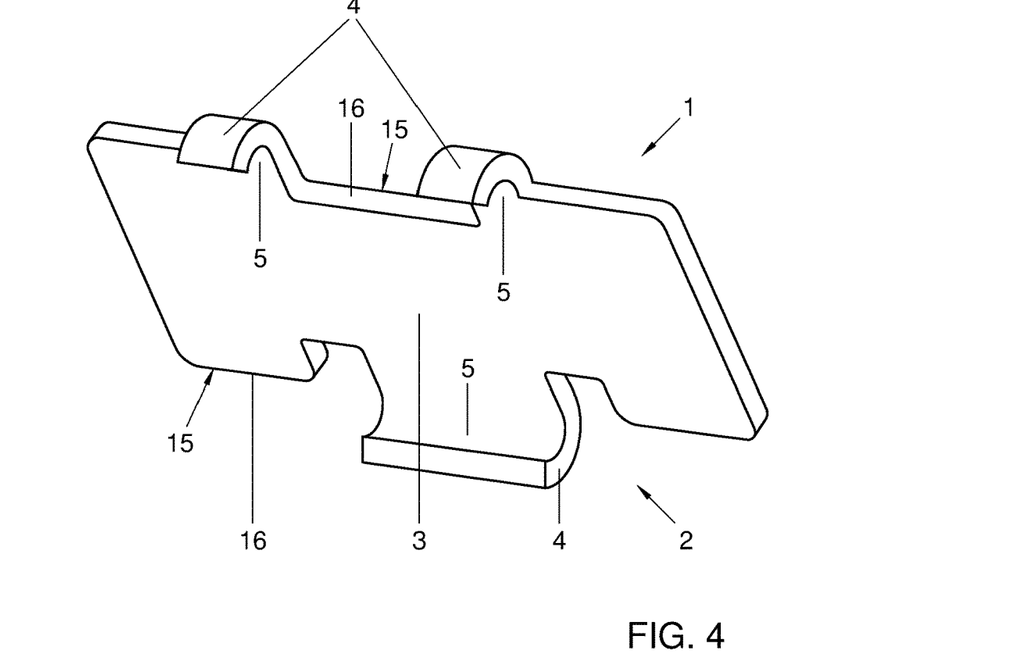
FIG. 4 shows a perspective bottom view of a first embodiment according to the invention

FIG. 4 shows a first embodiment of a chain module according to the invention, depicting a module 1 for a modular conveyor chain 8, comprising a link portion 2 made of sheet metal that includes a substantially elongate conveying body 3, having a centrally located coupling piece 4 on one longitudinal side thereof and a pair of coupling pieces 4 on an opposite longitudinal side thereof, that are interspaced to receive the centrally located coupling piece 4 of a link portion 2 of a consecutive module there between, wherein the coupling pieces 4 extend from the conveying body 3 to loop around a receiving space 5 for a hinge pin 7, wherein the coupling pieces 4 extend outwardly and forwardly from the conveying body 3, wherein the coupling pieces 4 form less then a three quarter loop relative to a plane P defined by the conveying body, wherein the coupling pieces 4 are partially tubular shaped, wherein a central axis of the coupling pieces 4 extends parallel to the longitudinal side of the conveying body 4, wherein the length of the coupling pieces extending parallel to the longitudinal side of the conveying body 3 is greater than the thickness of the conveying body 3. In particular, in accordance with the invention one or more of the coupling pieces may extend more than a quarter loop, yet no more than half or three quarters of a loop. A three quarter loop as meant here thus corresponds to the end face 12 of the coupling piece being at a 270° angle relative to the face 16 of the longitudinal edge 15 which the coupling piece departs from.

Figure 5:
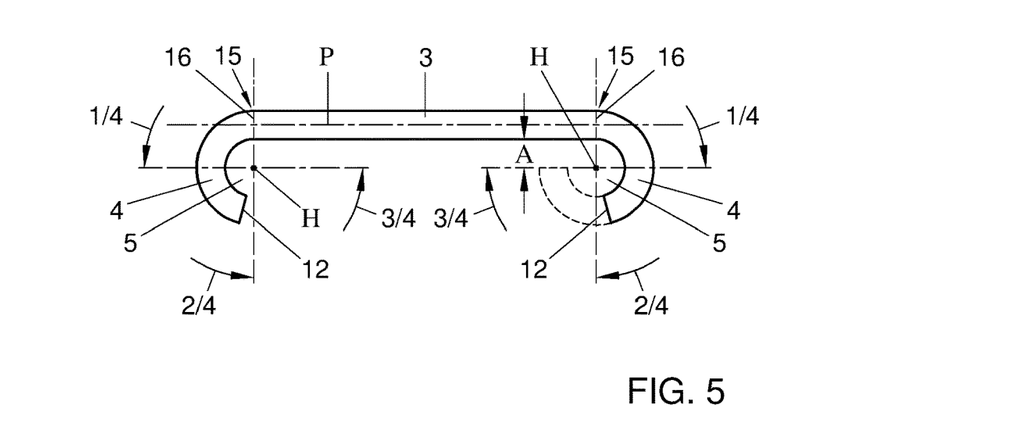
FIG. 5 shows a side view of the first embodiment.

In another embodiment the coupling pieces e.g. loop less then half a loop relative to a plane P. FIG. 5 shows a side view of a module 1 where the coupling pieces loop less then half a loop relative to the plane P. The full three quarter loop is indicated with a dotted line. An axis H can be defined that extends through the receiving space and substantially coincides with the central axis of a hinge pin 7 to be placed in the receiving space 5. However, the coupling pieces 4 may be as short as needed to be able to transfer tension loads from one module 1 to another via a hinge pin 7 placed in the receiving space 5 of two cooperating modules 1, but preferably loop more then a quarter loop relative to the plane P to guarantee that tension can still be transferred from the coupling pieces 4 via a hinge pin 7.

Figure 6:
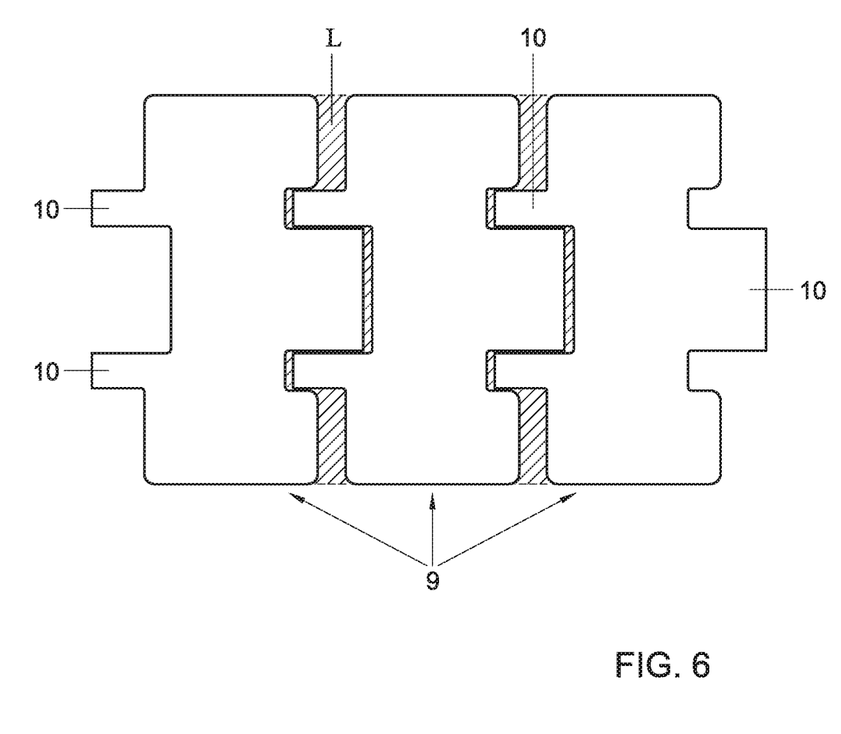
FIG. 6 shows a nesting pattern for blanks according to a first embodiment of the invention.

The shorter the coupling pieces 4 of a module 1 are, the shorter the tongues 10 for forming the coupling pieces are. The blanks 9 for forming a module 1 can be nested closer together for being punched out of sheet metal. FIG. 6 shows how blanks 9 can be nested in a punching pattern on a piece of sheet metal, where a centrally placed tongue 10 on a longitudinal side of a blank 9 will be nested in between two spaced apart tongues 10 on an opposite longitudinal side of a previous blank 9 or vice versa. As a result, the sheet material loss L can be reduced.

Figure 7A:
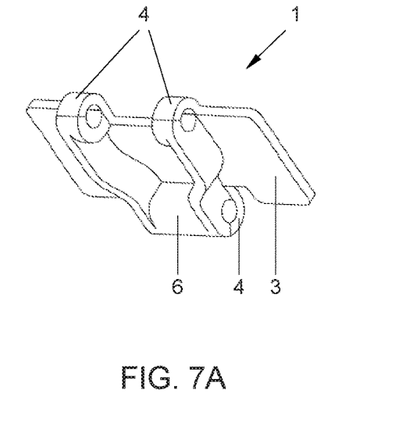
FIG. 7a,b show a perspective view of a second embodiment of a chain module according to the invention wherein a separate auxiliary element is provided on the module according to the invention.
Figure 7B:
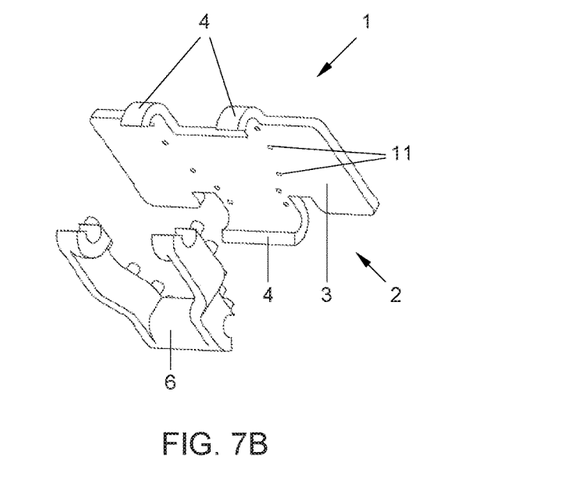
Figure 8A:
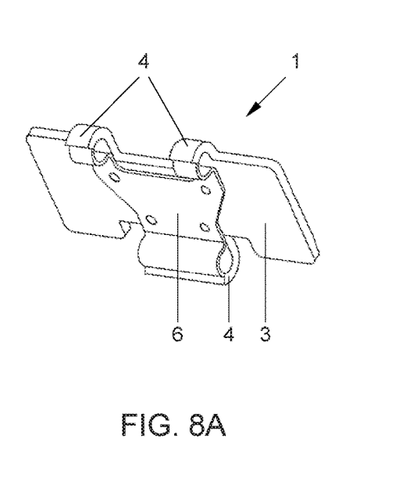
FIG. 8a,b shows a perspective view of a third embodiment of a chain module according to the invention wherein a separate auxiliary element is provided on the module according to the invention.
Figure 8B:
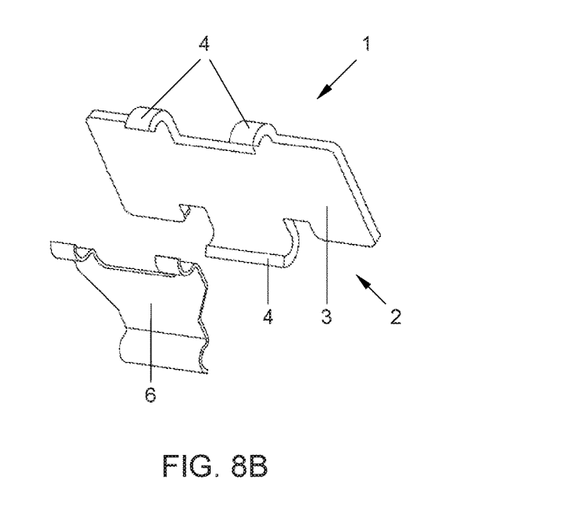
Figure 9:
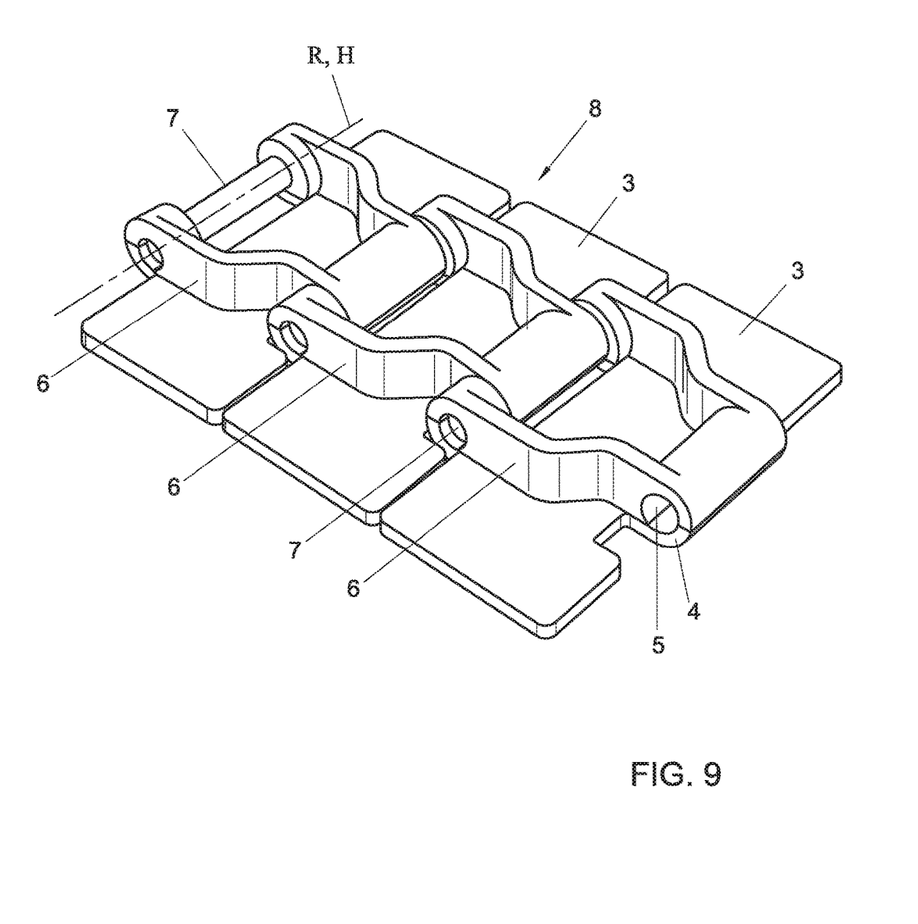
FIG. 9 shows a perspective view of a fourth embodiment of a modular conveyor chain according to the invention.

Normally, when a hinge pin 7 is placed in the receiving spaces 5 of two cooperating modules 1, the hinge pin 7 is kept in place due to the tension force acting on the modules 1 in a conveying direction, perpendicular to the axis of rotation of a hinge pin 7. However, to ensure that the hinge pin will not fall out when no tension force is present, the chain becomes slack or due to transversal forces acting on the hinge pin, an auxiliary element 6 may be provided for retaining a hinge pin 7 in the hinge receiving space 5. FIGS. 7 and 8 give two examples of how such an auxiliary element 6 can be provided. In these examples the auxiliary element 6 is provided on the bottom face of the conveying body 3. By providing the auxiliary element 6 on the bottom face of the conveying body 3, the upper face is left clear for transporting items thereon. However, it could also be possible that an auxiliary element 6 extends or is located on a top face of the conveying body 3. The auxiliary element 6 may be placed on all modules 1 that form a modular conveyor chain 8 or may be placed on selected modules 1. For example, every second module 1 of a conveyor chain 8 can be provided with an auxiliary element 6, such that all hinge pins 7 are retained. However, any other combination of auxiliary elements 6 being placed on modules 1 of a modular conveyor chain is possible. The auxiliary element 6 may retain the hinge pin 7 by exerting a force on the hinge pin 7 or may retain the hinge pin 7 by blocking the hinge pin in directions in which the hinge pin 7 can slip out of the receiving space. FIG. 9 shows how a hinge pin 7 is retained by an auxiliary element 6, wherein the hinge pin 7 is being prevented from axially slipping out of the receiving space 5.

In another embodiment the auxiliary element 6 may form an integral part of the module 1. This can be realized by e.g. punching a flap or cut-out in the conveying body 3 and bending it towards the bottom face of the conveying body 3, such that it may clamp and retain a hinge pin 7 to be placed in the receiving space 5. It should be understood that any other way of providing an integral auxiliary element 6 falls within the scope of the invention.

In a second embodiment of the invention, an auxiliary element 6 is shown that comprises plastic and is depicted in figures 7a and 7b. By providing an auxiliary element 6 that is made of plastic, an auxiliary element 6 can be realized that is inexpensive to manufacture and easy to apply to a module 1 for retaining a hinge pin 7. The auxiliary element 6 can be manufactured by means of injection molding and then being connected to the module 1 by means of adhesive, e.g. contact adhesive. In an alternative embodiment the auxiliary element 6 can also be bolted or screwed to the module 1. However, in the second embodiment the module 1 comprises holes and/or cavities, e.g. conical holes and/or cavities, such that the auxiliary element 6 can be applied to the module 1 by means of injection molding. The conical shape of the holes and/or cavities 11 are filled with plastic material to prevent the auxiliary element 6 to detach from the module 1.

In a third embodiment of the invention, the auxiliary element 6 comprises metal. Preferably the auxiliary element 6 is integrally formed of a piece of sheet metal and may retain at least one hinge pin 7 to be placed in a receiving space 5. The sheet metal used for the auxiliary element 6 may be thinner or of a lower grade then the sheet metal used for punching and forming a module 1. Again the auxiliary element 6 may be connected to the module 1 by means of adhesive or bolts and screws. However, in this embodiment the auxiliary element is connected to the module 1 by means of welding and/or spot welding.

With a series of modules 1 according to the above, a modular conveyor chain 8 can be formed, wherein the centrally located coupling piece 4 of a module 1 is received by the interspaced coupling pieces 4 of a consecutive module 1, wherein cooperating coupling pieces 4 are connected by means of a hinge pin 7 extending through the receiving space.

The hinge pin 7 that extends through the receiving space 5 has a rotation axis R, which axis R substantially defines the axis of rotation H between two consecutive modules 1. FIG. 5 shows that for every module 1 quadrants of an axis system can be defined in a plane perpendicular to the axis of rotation H, wherein the origins of the quadrants and the axis system are coinciding with the rotation axis H and wherein the first positive axis is substantially parallel to the plane P defined by the conveying body 3. The coupling pieces 4 are looped either in a positive or negative direction starting from the second positive axis of the quadrants, depending on which longitudinal side of the conveying body 3, and loop less then three quadrants around the rotation axis H. Preferably, the coupling pieces 4 loop less then two quadrants around the rotation axis H, while the coupling pieces 4 loop more then one quarter around rotation axis H.

Figure 10:
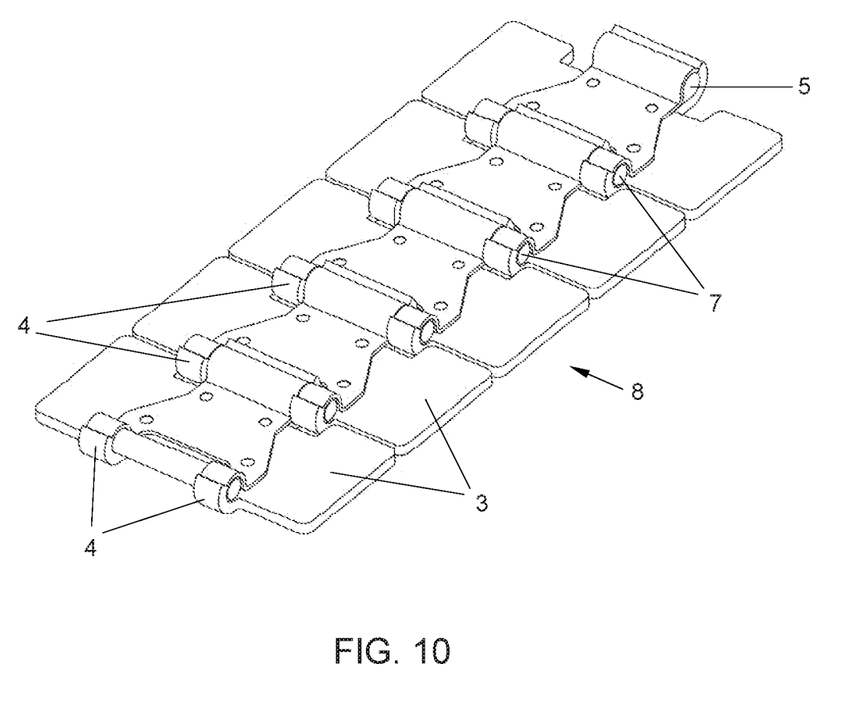
FIG. 10 shows a perspective view of a fifth embodiment of a modular conveyor chain according to the invention.

FIGS. 9 and 10 show a fourth and fifth embodiment, wherein an auxiliary element 6 is provided. The auxiliary element 6 is placed on at least one module 1 for retaining a hinge pin 7. In these examples the auxiliary element 6 is provided on all the modules 1, but also every second module 1 may be provided with an auxiliary element 6 to be able to retain a hinge pin 7 between two cooperating modules 1. It should be clear that any other series of modules 1 with or without an auxiliary element 6 for forming a modular conveyor chain 8 falls within the scope of the invention.

FIG. 9 shows a modular conveyor chain 8, formed by a series of modules 1 with plastic auxiliary elements 6 according to the second embodiment of the invention. FIG. 10 shows a modular conveyor chain 8, formed by a series of modules 1 with metal auxiliary elements 6 according to the third embodiment of the invention.

Figure 11:
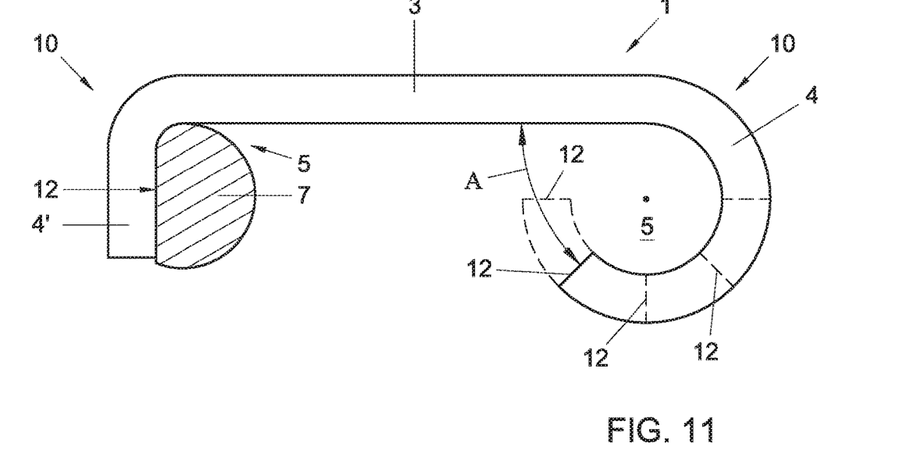
FIG. 11 shows a perspective side view of a sixth embodiment of a chain module according to the invention.

FIG. 11 shows a further embodiment according to the invention, wherein the module 1 comprises coupling pieces 4 and second coupling pieces, 4'. In this embodiment, the at least one coupling piece 4 is positioned at one longitudinal side of the conveying body 3, e.g. a centrally located coupling piece 4. On the opposite longitudinal side of the conveying body 3 at least one second coupling piece 4' is placed, e.g. two spaced apart second coupling pieces 4'.

The For example, the tongue 10 of the centrally located coupling element 4 may be looped into less than e.g. half or three quarters of a loop, while the spaced apart tongues 10 of the second coupling elements 4' may be bent to extend straight, e.g. straight downwards seen from the conveying body 3 forming a conveying surface for placing objects thereon. The spaced apart coupling elements 4' may then carry a hinge pin 7 that is fixedly connected thereto, e.g. by means of welding. The hinge pin 7 may further include a flattened portion 12 as seen in FIGS. 11 and 12, so that it as least locally has a D-shaped cross section.

It should be clear, however, that the placement of coupling pieces 4, 4' can also be arranged vice versa, e.g. the spaced apart coupling piece 4 of which tongues 10 are looped into less then e.g. half or three quarters of a loop, while the central tongue 10 extends straight down.

Figure 12:
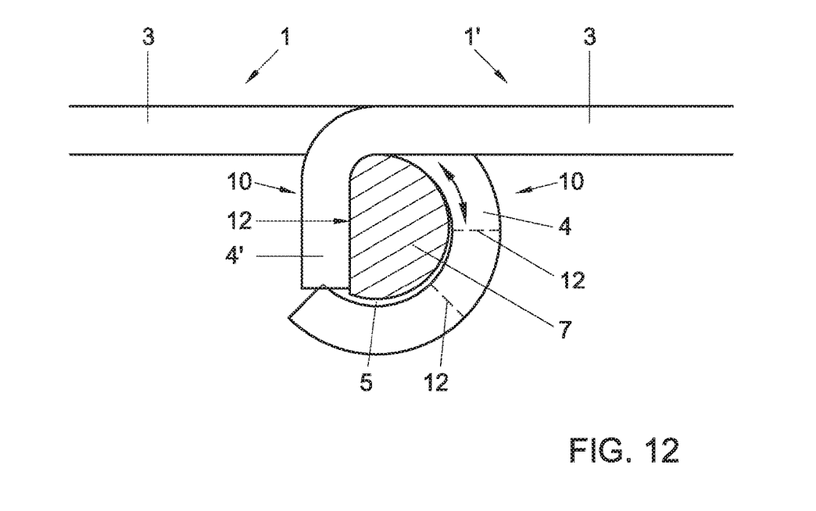
FIG. 12 shows a perspective side view of a part of modular conveyor chain, at least partly build up with chain modules according to FIG. 6.

FIG. 12 shows how two chain modules 1, 1' are coupled be means of a hinge pin 7, placed in the hinge receiving space 5. The hinge pin 7 has at least along a part thereof a substantially D-shaped cross-section, such that the D-shaped cross-section or cross-section of the hinge pin 7 coincides with the flat tongues 10 of the second coupling element 4'. The remaining part of the hinge pin 7 can have a differently shaped cross-section. In the example shown in FIG. 12, the flattened portion 12 of the hinge pin is e.g. welded to the second coupling piece 4' and the coupling piece 4 of the module 1 is free to slide over the non-flattened part of the hinge pin 7 during flexing of the modules 1, 1' with respect to each other, which non-flattened part is substantially circular or round. The gap 13 between the end face 12 of the looped coupling piece 4' and the bottom face 14 of the conveying body allows the hinge pin 7 to pass to and from the receiving space owing to the D shape's locally reduced cross sectional area.

In another embodiment, a modular conveyor chain 8 can be formed by a series of modules 1 with metal and/or plastic auxiliary elements 6.

The modular conveyor chain 8 according to the invention may have a pitch of 1.5 inch and may comprise modules 1 that fulfil the size requirements of a customary chain with respect to sheet metal thickness, hinge pin diameter and width of the hinge assembly, according to DIN 8153/ISO 4348. By providing a modular conveyor chain 8 that fulfils the DIN and ISO standardization in said aspects, the modular conveyor chain 8 according to the invention can be used as a replacement for customary chains in existing conveyor systems, without the need of modifying the conveyor system. Other pitches, e.g. 1 inch or 2 inch are also amongst the possibilities. However, the modular conveyor chain 8 according to the invention may be scaled to any other desired size and weight requirement.

Generic to their complete disclosure, the following is observed. The feature that a coupling piece forms less than a quarter loop allows the end face 12 of the coupling piece to be distanced further from the bottom face of the conveying body 3. This allows for a through pass aperture A between the end face 12 and the bottom face through which aperture of a hinge pin that is provide with a locally reduced diameter may pass. In particular a hinge pin that is fixedly carried on an opposite coupling piece may be angled with a flattened D shaped end portion to pass through the aperture A, and may then be angled back to be locked in place, so that its rounded end cooperates with the hinge loop to transfer tensile forces on the chain.

Many variations will be apparent to the skilled person in the art. Such variations are understood to be comprised within the scope of the invention defined in the appended claims

LIST OF REFERENCE NUMERALS 1. module
2. link portion
3. conveying body
4. coupling piece
5. receiving space
6. auxiliary element
7. hinge pin
8. modular conveyor chain
9. blank
10. tongue
11. holes/cavities
12. end face
13. gap
14. bottom face
15. longitudinal edge
16. face
A. through pass aperture
H. rotation axis
R. rotation axis

The invention claimed is:

1. A module for a modular conveyor chain, said module comprising:
a link portion made of sheet metal that includes a substantially elongate conveying body having opposing longitudinal sides;
a centrally located coupling piece on one of said longitudinal sides; and
a pair of coupling pieces on an opposite longitudinal side of said conveying body, said coupling pieces of said pair of coupling pieces being interspaced to receive a centrally located coupling piece of a link portion of a consecutive module there between, wherein the coupling pieces extend from the body part to loop around a receiving space for a hinge pin, the receiving space defining an axis, and that at least one of the coupling pieces forms less than a three quarter loop relative to a plane defined by the conveying body such that a radially-aligned end face of the at least one of the coupling pieces is oriented at an angle from one of the opposing longitudinal sides that is less than 270 degrees about the axis.

2. A module for a modular conveyor chain according to claim 1, wherein the coupling pieces form less than half a loop relative to the plane defined by the conveying body.

3. A module for a modular conveyor chain according to claim 1, wherein the coupling pieces form more than a quarter loop relative to the plane defined by the conveying body.

4. A module for a modular conveyor chain according to claim 1, wherein an auxiliary element is provided for retaining a hinge pin in the hinge receiving space.

5. A module for a modular conveyor chain according to claim 4, wherein the auxiliary element is provided on the bottom face of the conveying body.

6. A module for a modular conveyor chain according to claim 4, wherein the auxiliary element is integrally formed with the module.

7. A module for a modular conveyor chain according to claim 4, wherein the auxiliary element comprises plastic.

8. A module for a modular conveyor chain according to claim 4, wherein the auxiliary element is connected to the module by means of injection molding.

9. A module for a modular conveyor chain according to claim 4, wherein the auxiliary element is connected to the module by means of adhesive.

10. A module for a modular conveyor chain according to claim 4, wherein the auxiliary element comprises metal.

11. A module for a modular conveyor chain according to claim 10, wherein the auxiliary element is connected to the module by welding.

12. A modular conveyor chain, comprising a series of modules according to claim 1, wherein the centrally located coupling piece of a module is received by the interspaced coupling pieces of a consecutive module, wherein cooperating coupling pieces are connected by a hinge pin extending through the receiving space.

13. A modular conveyor chain according to claim 12, wherein the hinge pin that extends through the receiving space has a rotation axis, which axis substantially defines the axis of rotation between two consecutive modules, wherein for every module quadrants can be defined in a plane perpendicular to the axis of rotation, wherein the origins of the quadrants coincide with the rotation axis and wherein the first positive axis is substantially parallel to the plane defined by the conveying body.

14. A modular conveyor chain according to claim 12, wherein an auxiliary element provided for retaining a hinge pin in the hinge receiving space is provided on a least one module for retaining a hinge pin in the hinge receiving space.

15. A modular conveyor chain according to claim 12, wherein the hinge pin located between the module and the consecutive module is fixedly connected to at least one coupling piece of the module or the consecutive module.

16. A hinge pin for use in a hinge receiving space of a module according to claim 1 and for use in a modular conveyor chain including a series of modules according to claim 1, wherein the centrally located coupling piece of a module is received by the interspaced coupling pieces of a consecutive module, wherein cooperating coupling pieces are connected by a hinge pin extending through the receiving space, wherein the hinge pin has a substantially round cross section.

17. A hinge pin according to claim 16, wherein the cross-section of the hinge pin is at least partly substantially D-shaped.

18. A module for a modular conveyor chain, said module comprising:
- a link portion made of sheet metal that includes a substantially elongate conveying body having opposing longitudinal sides;
- a centrally located coupling piece on one of said longitudinal sides; and
- a pair of coupling pieces on an opposite longitudinal side of said conveying body, said coupling pieces of said pair of coupling pieces being interspaced to receive a centrally located coupling piece of a link portion of a consecutive module there between, wherein the coupling pieces extend from the body part to loop around a receiving space for a hinge pin, and that at least one of the coupling pieces forms less than a three quarter loop relative to a plane defined by the conveying body;
- wherein an auxiliary element is provided for retaining a hinge pin in the hinge receiving space; and
- wherein the auxiliary element is provided on the bottom face of the conveying body.

19. A module for a modular conveyor chain, said module comprising:
- a link portion made of sheet metal that includes a substantially elongate conveying body having opposing longitudinal sides;
- a centrally located coupling piece on one of said longitudinal sides; and
- a pair of coupling pieces on an opposite longitudinal side of said conveying body, said coupling pieces of said pair of coupling pieces being interspaced to receive a centrally located coupling piece of a link portion of a consecutive module there between, wherein the coupling pieces extend from the body part to loop around a receiving space for a hinge pin, and that at least one of the coupling pieces forms less than a three quarter loop relative to a plane defined by the conveying body;
- wherein an auxiliary element is provided for retaining a hinge pin in the hinge receiving space; and
- wherein the auxiliary element is integrally formed with the module.

20. A module for a modular conveyor chain, said module comprising:
- a link portion made of sheet metal that includes a substantially elongate conveying body having opposing longitudinal sides;
- a centrally located coupling piece on one of said longitudinal sides; and
- a pair of coupling pieces on an opposite longitudinal side of said conveying body, said coupling pieces of said pair of coupling pieces being interspaced to receive a centrally located coupling piece of a link portion of a consecutive module there between, wherein the coupling pieces extend from the body part to loop around a receiving space for a hinge pin, and that at least one of the coupling pieces forms less than a three quarter loop relative to a plane defined by the conveying body;
- wherein an auxiliary element is provided for retaining a hinge pin in the hinge receiving space; and
- wherein the auxiliary element is connected to the module by means of injection molding.

21. A module for a modular conveyor chain, said module comprising:
- a link portion made of sheet metal that includes a substantially elongate conveying body having opposing longitudinal sides;
- a centrally located coupling piece on one of said longitudinal sides; and
- a pair of coupling pieces on an opposite longitudinal side of said conveying body, said coupling pieces of said pair of coupling pieces being interspaced to receive a centrally located coupling piece of a link portion of a consecutive module there between, wherein the coupling pieces extend from the body part to loop around a receiving space for a hinge pin, and that at least one of the coupling pieces forms less than a three quarter loop relative to a plane defined by the conveying body;

wherein an auxiliary element is provided for retaining a hinge pin in the hinge receiving space; and wherein the auxiliary element is connected to the module by means of adhesive.

22. A module for a modular conveyor chain, said module comprising:

a link portion made of sheet metal that includes a substantially elongate conveying body having opposing longitudinal sides;

a centrally located coupling piece on one of said longitudinal sides; and a pair of coupling pieces on an opposite longitudinal side of said conveying body, said coupling pieces of said pair of coupling pieces being interspaced to receive a centrally located coupling piece of a link portion of a consecutive module there between, wherein the coupling pieces extend from the body part to loop around a receiving space for a hinge pin, and that at least one of the coupling pieces forms less than a three quarter loop relative to a plane defined by the conveying body;

wherein an auxiliary element is provided for retaining a hinge pin in the hinge receiving space;

wherein the auxiliary element comprises metal; and wherein the auxiliary element is connected to the module by welding.

23. A module for a modular conveyor chain, said module comprising:

a link portion made of sheet metal that includes a substantially elongate conveying body having opposing longitudinal sides;

a centrally located coupling piece on one of said longitudinal sides; and a pair of coupling pieces on an opposite longitudinal side of said conveying body, said coupling pieces of said pair of coupling pieces being interspaced to receive a centrally located coupling piece of a link portion of a consecutive module there between, wherein the coupling pieces extend from the body part to loop around a receiving space for a hinge pin, and that at least one of the coupling pieces forms less than a three quarter loop relative to a plane defined by the conveying body;

wherein an auxiliary element is provided for retaining a hinge pin in the hinge receiving space.

* * * * *